(12) United States Patent
Wilsher

(10) Patent No.: US 6,850,641 B2
(45) Date of Patent: Feb. 1, 2005

(54) IMAGE PROCESSING APPARATUS

(75) Inventor: Michael John Wilsher, Herts (GB)

(73) Assignee: Fujifilm Electronic Imaging Limited, Herts (GB)

( * ) Notice: Subject to any disclaimer, the term of this patent is extended or adjusted under 35 U.S.C. 154(b) by 677 days.

(21) Appl. No.: 09/964,761

(22) Filed: Sep. 27, 2001

(65) Prior Publication Data

US 2003/0059109 A1 Mar. 27, 2003

(51) Int. Cl.$^7$ .............................................. G06K 9/00
(52) U.S. Cl. ..................... 382/167; 358/5.9; 358/521; 358/523; 345/617
(58) Field of Search ............................. 382/162–167; 358/518–540; 345/589–617

(56) References Cited

U.S. PATENT DOCUMENTS

| 4,731,662 | A |   | 3/1988  | Udagawa et al.              |
|-----------|---|---|---------|-----------------------------|
| 5,038,223 | A | * | 8/1991  | Yamada ............... 358/445 |
| 5,172,224 | A | * | 12/1992 | Collette et al. ........ 358/515 |
| 5,528,339 | A | * | 6/1996  | Buhr et al. ............. 355/32 |
| 5,822,453 | A | * | 10/1998 | Lee et al. .............. 382/169 |
| 5,844,699 | A | * | 12/1998 | Usami et al. ........... 358/518 |
| 5,999,175 | A | * | 12/1999 | Nalder ................ 345/766 |
| 6,097,470 | A | * | 8/2000  | Buhr et al. ............. 355/38 |
| 6,108,443 | A |   | 8/2000  | Ito                         |
| 6,285,784 | B1| * | 9/2001  | Spaulding et al. ....... 382/162 |
| 6,453,075 | B1| * | 9/2002  | Gallagher et al. ....... 382/260 |
| 6,594,388 | B1| * | 7/2003  | Gindele et al. ......... 382/167 |
| 6,717,698 | B1| * | 4/2004  | Lee ................... 358/1.9 |
| 6,778,691 | B1| * | 8/2004  | Barski et al. .......... 382/132 |

\* cited by examiner

*Primary Examiner*—Jingge Wu
(74) *Attorney, Agent, or Firm*—Sughrue Mion, PLLC

(57) ABSTRACT

Image processing apparatus comprises an input device; an output device; and a processor coupled to the input and output devices. The processor is adapted to compare the tone range of an image scanned by the input scanner and the tone range provided by the output scanner, and i. if the input tone range falls wholly within the output tone range, to cause the output device to render an absolute reproduction of the image, or ii. if the input tone range overlaps the output tone range, to cause the output device to render a reproduction of the image in which that part of the input tone range falling outside the output tone range has substantially been mapped into the output tone range, providing a pleasing appearance.

5 Claims, 2 Drawing Sheets

Fig.2.

| Chose next level if: | Rendering Intent | Input & Output Profile Targets |
|---|---|---|
| 20 White or Black point missed | ABSOLUTE | Image ew L*<br>Image eb L*<br><br>(Do Nothing) |
| 21 White and Black point missed | ABSOLUTE With White or Black mapping<br><br>Image White point OR Image Black point mapped | 2% White L*<br>Image eb L*<br>OR<br>98% Black L*<br>Image ew L* |
| 22 Gamut missed | ABSOLUTE With White and Black mapping<br><br>Image White & Black points mapped | 2% White L*<br>98% Black L* |
| 23 | PERCEPTUAL<br><br>Image White & Black points Image dependent gamut mapping | The PCS<br>97 L* and 4 L*<br>equate to approximately<br>2% & 98% |

IMAGE PROCESSING APPARATUS

FIELD OF THE INVENTION

The invention relates to an image processing apparatus.

DESCRIPTION OF THE PRIOR ART

In facsimile and other reproduction processes, the intention is to output an image which has as near as possible the same colours as the input image. In practice, this can be difficult because the colour gamut of the input image and input device does not always coincide with the output gamut available from the output device and output medium. The ICC provides four fixed rendering intents, Absolute, Relative, Perceptual and Saturation.

Absolute will try and reproduce a colormetrical rendition, any input image information outside the gamut of the output media will be lost.

Relative will map the input media white point to the output media white point but again will lose any image data outside the output media black point and output gamut. In addition the white point mapping can introduce a colour cast in the output image from the original.

Perceptual will perform white and black point mapping in addition to fitting the two media gamuts. This may introduce some colour cast in the output image from the original but since the whole range is mapped loss of image detail should not occur. However it does map the image range to the output media range and as such changes the look of the image, so in general will not produce an exact facsimile of originals which are inside the output gamut.

Saturation is not considered here as it is not normally used in the graphics arts industry.

Each method of rendering described above will provide a different result and it is time consuming for an operator to decide which is the best approach.

SUMMARY OF INVENTION

In accordance with the present invention, image processing apparatus comprises an input device; an output device; and a processor coupled to the input and output devices, the processor being adapted to compare the tone range of an image input via the input device and the tone range provided by the output device, and i. if the input tone range falls wholly within the output tone range, to cause the output device to render an absolute reproduction of the image, or ii. if the input tone range overlaps the output tone range, to cause the output device to render a reproduction of the image in which that part of the input tone range falling outside the output tone range has substantially been mapped into the output tone range.

We have devised apparatus which can automatically determine the most appropriate rendering method and which achieves satisfactory results in most cases without clipping out of range tones.

In step (i), the white and black points will typically not be remapped although in some cases they could be adjusted. Similarly in step (ii), it may be that not all points outside the gamut will be mapped inside.

In some cases, mapping the tone ranges alone may not yield an entirely satisfactory result. Preferably, therefore, step (ii) further comprises determining if the input colour gamut of the input device and image falls outside the output colour gamut of the output device and output medium by more than a predetermined amount and, if it does, mapping the input colour gamut to the output colour gamut using a perceptual mapping algorithm.

The predetermined amount could be zero but typically is around 12%. Thus, in cases where the input image includes unusual proportions of extreme colours, this can be overcome by using a perceptual mapping algorithm.

For convenience, the processor will operate on the tone ranges in Profile Connection Space since modern input and output devices are provided with respective profiles for converting image data into PCS. However, it will be readily apparent that the invention is equally applicable to operate on tone ranges in other colour spaces.

In order to minimise the degree of mapping which takes place, preferably in step (ii), if only one extreme of the input tone range falls outside the output tone range, the method comprises maintaining the other extreme substantially constant and mapping the remainder of the input tone range proportionally.

Typically, the extremes of the input tone range will be compared with 2–98% of the output tone range. This is because the extremities may have multiple solutions in typical ICC profiles, i.e. there is not a unique $L^*$ value that corresponds to 0% or 100%. However, using values just in from the minimum and maximum values tend to give better defined $L^*$ results. 2% and 98% are typical values, although this does not exclude other points or methods being used to find the $L^*$ range of the output media.

BRIEF DESCRIPTION OF THE DRAWINGS

An example of apparatus according to the invention will now be described with reference to the accompanying drawings, in which:

FIG. 2 is a flow diagram illustrating operation of the processor shown in FIG. 1; and, FIG. 3 illustrates graphically the processes outlined in FIG. 2.

DETAILED DESCRIPTION OF EMBODIMENT

Figure 1:
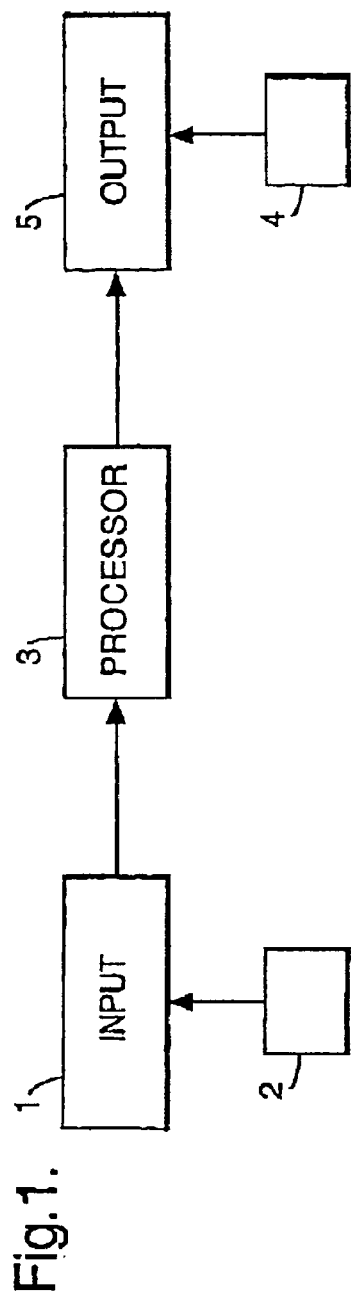
FIG. 1 is a block diagram of the apparatus.

The apparatus shown in FIG. 1 comprises an input device 1 such as an input scanner associated with an ICC profile 2. This profile will typically define the mapping of input image information into PCS. Output data from the input device 1 is fed to a processor 3 which then maps the data in the manner to be described below using output profile data 4 to an output device 5 such as an output scanner.

The processor 3 operates on data in PCS in which the colour of each pixel of the image is defined by components $L^*ab$ in a conventional manner. Tone is defined by the component $L^*$. Input data from the input device 1 is first reviewed by the processor 3 to determine the white and black points (Image $ewL^*$ and Image $ebL^*$). These extremes of the input tones are compared with extremes 10,11 (FIG. 3) of the output tones available. If both the image white and black points fall within the range defined by the extremes 10,11 as shown at 12 then each input tone can be exactly matched to a corresponding output tone and an absolute rendering is produced. This is indicated by a row 20 in FIG. 2.

Figure 3:
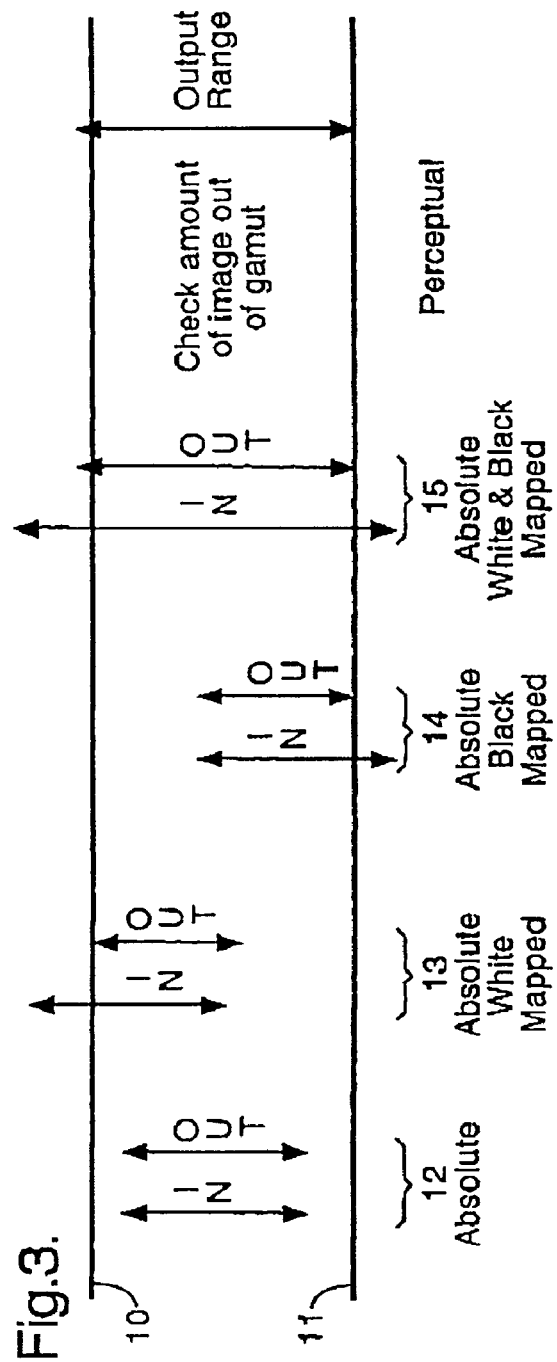

If the image white point falls outside the white extreme point 10 of the output profile as shown at 13 in FIG. 3 then the image data is simply mapped to bring the white point into gamut while the black point is substantially unchanged.

This gives a gradual change where most of the image remains untouched and only the points out of gamut are moved. This is indicated at row 21 in FIG. 2.

In practice, the extreme points of the output profile are set just inside the actual extreme points representing 2% and 98% output L* respectively. The reason for this is that points just inside the output media range of 0% to 100% may be more clearly defined when examining a typical ICC profile.

Similarly, if the image black point lies outside the output profile black extreme 11 as shown at 14 then the black point is mapped to the output black point while the white point remains substantially unchanged.

For these mapping operations, any conventional tone mapping technique can be used.

If both the white and black image points lie outside the output range as shown at 15 then both points are mapped into the range using the simple mapping method. This is shown at row 22 in FIG. 2. In this case, however, it is more likely that a significant proportion of the input colour gamut will lie outside the output colour gamut in which case instead of performing a simple mapping, the input range and colour gamut are mapped onto the output range and colour gamut to produce a visually pleasing result. This is indicated by row 23 in FIG. 2.

Although the gamut mapping using the perceptual technique has been described for use when both black and white points have to be mapped, it could also be used in the other modes mentioned above.

Typically, perceptual mapping will be used if more than 12% of the colour input gamut falls outside the output gamut. In practice, it is undesirable to use perceptual mapping as soon as any part of the input image is outside the output gamut. Some "clipping" is generally acceptable and it was found that 12% was about the point where full gamut mapping gave a better result than simply range mapping.

A simple code flow of the process is presented below:

1) Find Image ew/eb points in Lab

These will be the Absolute targets i.e. the desired reproduction

Image EW

Image EB

2) Find the achievable targets on the output (2% and 98%) expressed in L*

Look for this value by looking for all output values to be in the range 2% to 98% just inside gamut. Find the L*'s inside gamut to achieve this. This can be done by using the colour of the original image white and black points and ensuring that all output channels are within range, or testing some neutralised form of the input values.

Output White

Output Black

3) Select the targets to be used

White target=If (Image EW<Output white)

Image EW else

Output White

BlackTarget=If (Image EB<Output Black)

Image EB else

Output Black

After this mapping, the amount of image in gamut is checked, one method is to determine the amount of the image outside the 2% and 98% points in the output media. This simply means checking all of the image output values to see if they reside outside 2% and 98%, this will normally occur in saturated colours after tone mapping. If the amount is deemed unacceptable then Perceptual rendering can be used.

I claim:

1. Image processing apparatus comprising an input device; an output device; and a processor coupled to the input and output devices, the processor being adapted to compare the tone range of an image input via the input device and the tone range provided by the output device, and i. if the input tone range falls wholly within the output tone range, to cause the output device to render an absolute reproduction of the image, or ii. if the input tone range overlaps the output tone range, to cause the output device to render a reproduction of the image in which that part of the input tone range falling outside the output tone range has substantially been mapped into the output tone range.

2. Apparatus according to claim 1, wherein step (ii) further comprises determining if the input colour gamut of the input device and image falls outside the output colour gamut of the output device and output medium by more than a predetermined amount and, if it does, mapping the input colour gamut to the output colour gamut using a perceptual mapping algorithm.

3. Apparatus according to claim 2, wherein the predetermined amount is about 12%.

4. Apparatus according to claim 1, wherein the processor operates on the tone ranges in profile connection space.

5. Apparatus according to claim 1, wherein in step (ii), if only one extreme of the input tone range falls outside the output tone range, the method comprises maintaining the other extreme substantially constant and mapping the remainder of the input tone range proportionally, providing a pleasing appearance.

* * * * *